US 6,411,407 B1

(12) United States Patent
Maxham

(10) Patent No.: US 6,411,407 B1
(45) Date of Patent: Jun. 25, 2002

(54) METHOD FOR PROVIDING A BIDIRECTIONAL OPTICAL SUPERVISORY CHANNEL

(75) Inventor: Kenneth Y. Maxham, Richardson, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/156,794

(22) Filed: Sep. 17, 1998

(51) Int. Cl.[7] ............................................. H04B 10/08
(52) U.S. Cl. ........................ 359/110; 359/124; 359/174; 359/179
(58) Field of Search ............................. 359/110, 124, 359/154, 173, 174, 179, 341

(56) References Cited

U.S. PATENT DOCUMENTS

| | | | |
|---|---|---|---|
| 4,451,916 A | 5/1984 | Casper et al. ................. | 370/16 |
| 4,833,668 A | 5/1989 | Rowley et al. ................. | 370/1 |
| 5,113,459 A | 5/1992 | Grasso et al. ................. | 385/24 |
| 5,150,243 A | 9/1992 | Suzuki ........................... | 359/110 |
| 5,170,447 A | 12/1992 | Heidemann ................... | 385/24 |
| 5,274,496 A | 12/1993 | Fujiwara et al. .............. | 359/177 |
| 5,299,048 A | 3/1994 | Suyama ........................ | 359/179 |
| 5,383,046 A | 1/1995 | Tomofuji et al. .............. | 359/176 |
| 5,394,265 A | 2/1995 | Nagel et al. .................. | 359/341 |
| 5,455,704 A | 10/1995 | Mizuochi et al. ............. | 359/179 |
| 5,500,756 A | 3/1996 | Tsushima et al. ............ | 359/174 |
| 5,510,931 A | 4/1996 | Suyama ........................ | 359/341 |
| 5,521,737 A | 5/1996 | Suyama ........................ | 359/160 |
| 5,532,864 A | 7/1996 | Alexander et al. ........... | 359/177 |
| 5,535,037 A | 7/1996 | Yoneyama ................... | 359/177 |
| 5,535,050 A | 7/1996 | Suyama ........................ | 359/341 |
| 5,546,213 A | 8/1996 | Suyama ........................ | 359/179 |
| 5,555,477 A | 9/1996 | Tomooka et al. ............ | 359/115 |
| 6,046,833 A * | 4/2000 | Sharma et al. .............. | 359/110 X |

* cited by examiner

Primary Examiner—Thomas Mullen

(57) ABSTRACT

Optical supervisory channels are provided in an optical fiber network by receiving, in a first network element (10), a first optical supervisory channel signal (12) at a first wavelength (λ1) from a first direction (14) on a first optical fiber (16), and by transmitting, from the first network element (10), a second optical supervisory channel signal (18) at a second wavelength (λ2) in a second direction (20) and also on the first optical fiber (16). An amplified optical wavelength division multiplexed transmission system utilizing these supervisory signals divides a revenue-traffic amplifying region of an optical amplifier, with a lower portion being used for transmission in the first direction and an upper portion being used for transmission in the second direction. Both the first and second wavelengths are located outside of a flat-gain amplifying region of the optical amplifier.

22 Claims, 6 Drawing Sheets

\* Wavelength of the OSC is 1528 nm for combining with short-band traffic channels, and 1563 nm for combining with long-band traffic channels. SCW Filter 1 drops/adds 1528 nm, and SCW Filter 2 drops/ adds 1563 nm. Thus, for bidirectional, the upper amplifier must use OSC filter 2.

METHOD FOR PROVIDING A BIDIRECTIONAL OPTICAL SUPERVISORY CHANNEL

BACKGROUND OF THE INVENTION

1. Technical Field

The present invention relates to telecommunications networks interconnected using optical fibers and, more particularly, to transmission of a supervisory channel among multiple traffic channels carried by such optical fibers.

2. Discussion of Related Art

Fiber optic transmission systems are capable of operating multiple channels on a single fiber using wavelength-division multiplexing (WDM). Some systems transmit all WDM channels in one direction on the fiber, so that two fibers are needed to achieve duplex communication. Bidirectional operation, on the other hand, can operate in both directions on a single fiber. The problem is that presently available optical supervisory channels (OSC) can only operate in one direction on the fiber. (The OSC is used for system maintenance and alarm reporting to/from remote sites.)

The reason for this shortcoming is that existing approaches use an OSC on one wavelength, such as 1310 nm or 1480 nm. But these techniques require two fibers to obtain duplex communication. Another simplex approach uses 1532 nm for an OSC, and inserts and drops it between the stages of a two-stage optical amplifier.

These approaches cannot obtain duplex communication on one fiber with bidirectional supervisory signals. In addition, the last-mentioned simplex approach using 1532 nm has the disadvantage that the 1532 nm OSC occupies a region of the optical amplifier that can be used for revenue-producing traffic channels.

SUMMARY OF INVENTION

The object of the present invention is to achieve duplex communications using wavelength division multiplexing on a single fiber with appropriate supervisory channels in both directions and to do so in an efficient manner.

According to a first aspect of the present invention, a method for communicating an optical supervisory channel (OSC) in an optical fiber network, comprises the steps of receiving, in a first network element, a first optical supervisory channel signal at a first wavelength from a first direction on a first optical fiber (16), and transmitting, from said first network element, a second optical supervisory channel signal at a second wavelength in a second direction (20) on said first optical fiber. Thus, according to the present invention, two wavelengths are used for the OSC, one for each direction on the fiber.

In further accord with the present invention, the first and second optical supervisory channel signals are transmitted with revenue traffic using wavelength-division-multiplexing. The first and second wavelengths are selected for passing through an optical amplifier in an amplified optical wavelength division multiplexed transmission system. Both the first and second wavelengths are located outside of a flat-gain amplifying region of the optical amplifier.

The OSC wavelengths are thus located where they can pass through an optical amplifier, but not occupy the "flat-gain" region that can be used for revenue-producing traffic. One example is to locate them in the regions slightly outside the flat-gain region where there is some gain, but is not otherwise usable. The first wavelength can reside below a revenue-traffic amplifying region of the optical amplifier and the second wavelength can reside above the revenue-traffic amplifying region, with both the first and second optical wavelengths in a low-loss window of the first optical fiber.

The present invention advantageously permits operation of a duplex OSC over a single fiber, saving the cost of a second fiber. Choosing wavelengths that do not consume space in the "flat-gain" region allows additional revenue-producing traffic channels.

These and other objects, features and advantages of the present invention will become more apparent in light of the following detailed description of a best mode embodiment thereof, as illustrated in the accompanying drawing.

DETAILED DESCRIPTION OF PREFERRED EMBODIMENTS

Figure 1A:
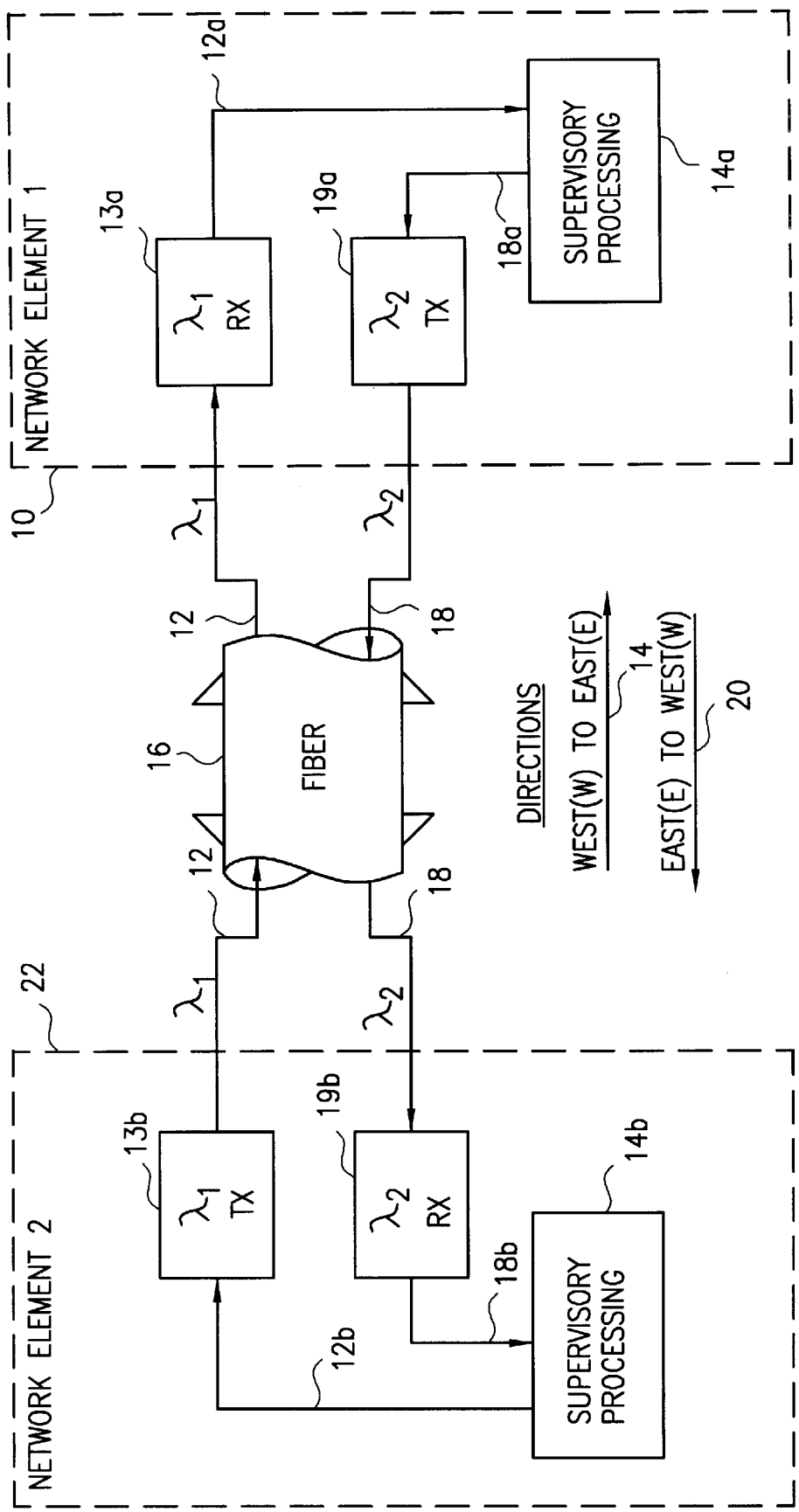
FIG. 1A shows a method, according to the present invention, for communicating an optical supervisory channel (OSC) in an optical fiber network.

FIG. 1A shows a method, according to the present invention, for communicating an optical supervisory channel (OSC) in an optical fiber network. In a first network element 10, a first optical supervisory channel signal on a line 12 is received in a receiver (λ1 RX) 13a at a first wavelength λ1 from a first direction 14 on a first optical fiber 16. The receiver 13a provides the first optical supervisory channel signal on a line 12a to a supervisory signal processor 14a. A second optical supervisory channel signal on a line 18 is transmitted from a transmitter (λ2 TX) 19a at a second wavelength λ2 from the first network element 10 in a second direction 20, also on the first optical fiber 16. The supervisory signal processor 14a provides the second optical supervisory signal on a line 18a to the transmitter (λ2 TX) 19a which provides it for transmission on the line 18. To simplify the illustration, wavelength division multiplexed optical traffic channels received from the first direction 14 along with the first optical supervisory channel signal on the line 12 are not shown. Similarly, optical traffic channels transmitted in the second direction 20 along with the second optical supervisory channel signal on the line 18 are not shown.

A second network element 22, receives the second optical supervisory channel signal on the line 18 in a receiver (λ2 RX) 19b at the second wavelength λ2 after it has traversed the fiber 16. It is then provided by the receiver (λ2 RX) 19b on a line 18b to a supervisory signal processor 14b. Also, in response to an optical signal on a line 12b from the processor 14b, a transmitter (λ1 TX) 13b provides the signal on the line 12b as the first optical supervisory channel signal on the line 12. The second network element 22 transmits the first optical supervisory channel signal 12 from the transmitter (λ1 TX) 13b at the first wavelength λ1 on the first optical fiber 16 which, as discussed above, is received by the network element 10.

Figure 1B:
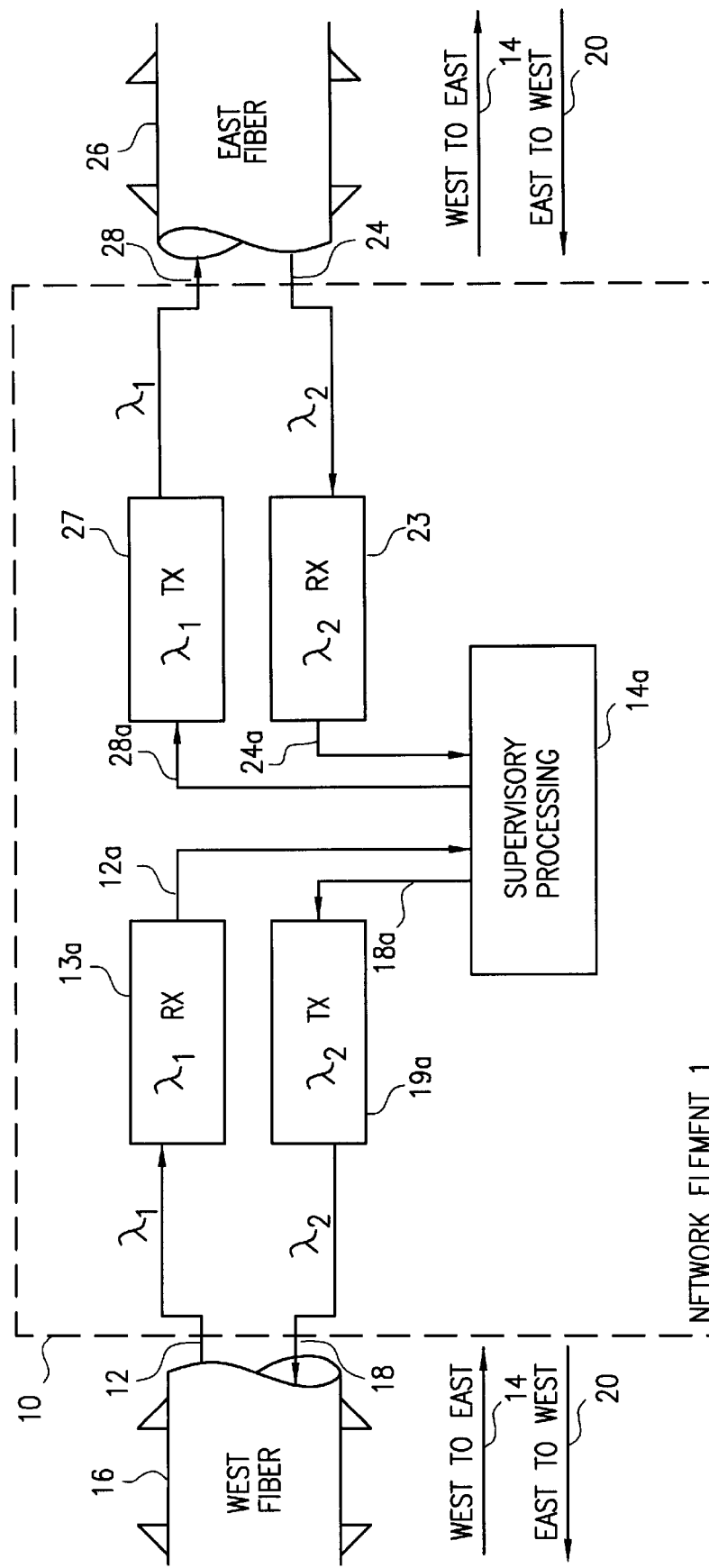
FIG. 1B shows the method of FIG. 1 as applied to both ports of a two-port network element.

It should be understood that an optical fiber network normally comprises numerous network elements interconnected by optical fibers and FIG. 1 only shows two such network elements. Consequently, a given network element such as the network element 10 will typically have, as shown in FIG. 1B, another port for connection to another network element (not shown), unless it is specifically designed and used as a termination point in the network. In FIG. 1B the fiber 16 of FIG. 1A is shown on the left as a "west" fiber because it can conveniently be characterized as connecting to the network element 22 to the "west." In this sense, the directions "west-to-east" 14 and "east-to-west" 20 are used conceptually across a chain of network elements to consistently denote the directions of signals propagating along the chain.

The network element 10 of FIG. 1B is shown receiving in a receiver 23 a third optical supervisory channel signal on a line 24 at the second wavelength λ2 from the second direction 20 on a second optical fiber 26. The receiver 23 provides the optical signal on the line 24 on a line 24a to the supervisory signal processor 14a. The network element 10 is also shown transmitting, from a transmitter 27, a fourth optical supervisory channel signal on a line 28 at the first wavelength λ1 in the first direction 14 on the second optical fiber 26. The transmitter 27 is responsive to an optical supervisory signal on a line 28a from the processor 14a and provides it as the optical signal on the line 28. It should be understood that the not shown traffic channels as well as the supervisory channels received and transmitted in a given network element are amplified at termination points of the fiber. This function can be viewed as being carried out by a pair of optical amplifiers in the transmitter 19a and the receiver 13a and in another pair of amplifiers in the transmitter 27 and the receiver 23. Access to the supervisory channels is available between the amplifiers in these two pairs, as shown more fully below.

Figure 2:
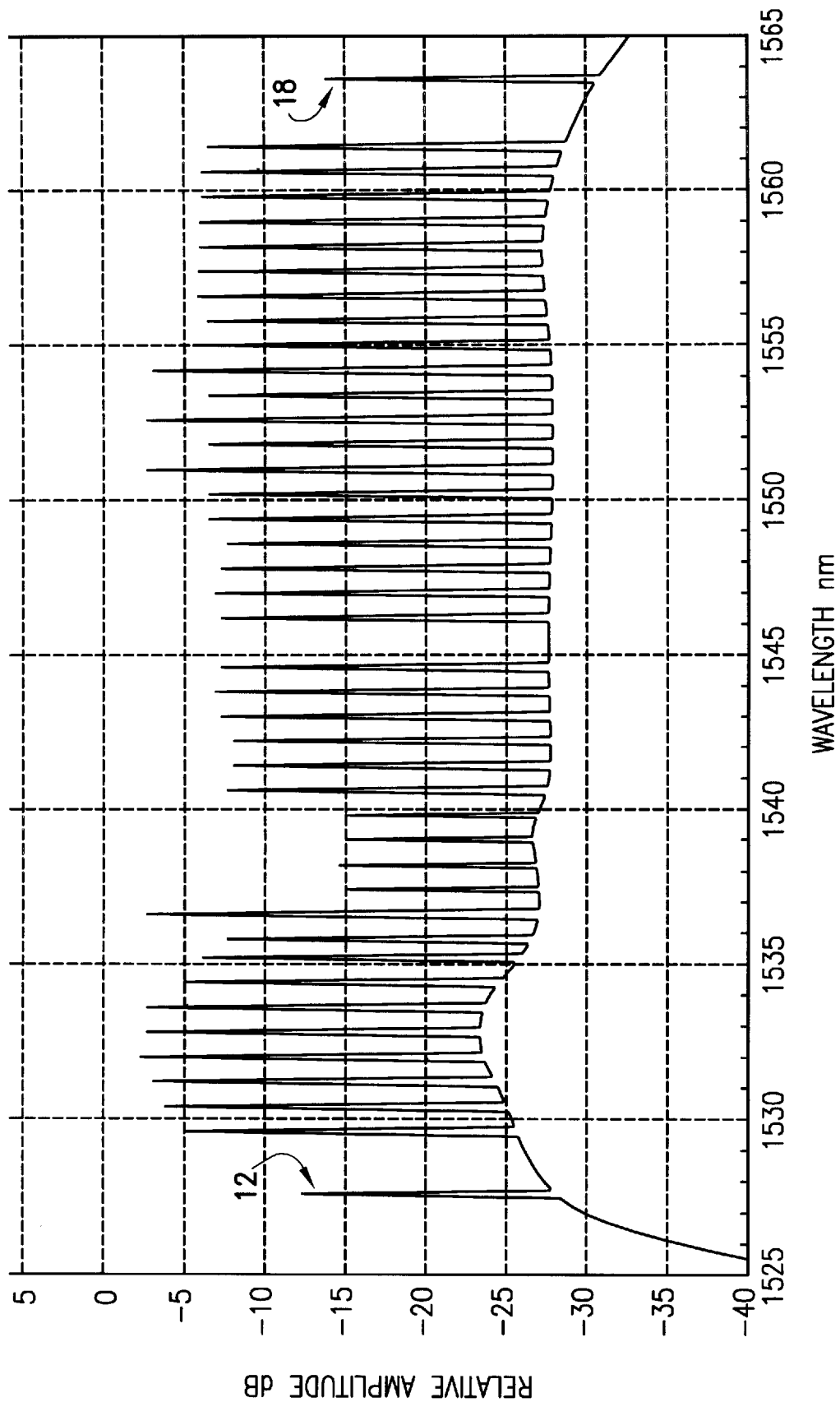
FIG. 2 shows the spectrum of a so-called Dense Wavelength Division Multiplexed signal at a terminus of a 400 km fiber span such as at an end of the fiber 16 of FIG. 1A.

Referring now to FIG. 2, the spectrum of a so-called Dense Wavelength Division Multiplexed signal is shown at a terminus of a 400 km fiber span such as at an end of the fiber 16 of FIG. 1A. The amplified optical wavelength division multiplexed transmission system of the invention divides a revenue-traffic amplifying region of the optical amplifier, with a lower portion being used for transmission in the first direction 14 and an upper portion being used for transmission in the second direction 20. According to the present invention, the first and second optical supervisory channel signals 12, 18 are transmitted with the revenue traffic using wavelength-division-multiplexing. The first and second wavelengths are selected for passing through an optical amplifier in the amplified optical wavelength division multiplexed transmission system. The first wavelength (λ1) of the first optical supervisory channel signal on the line 12 is shown at about 1528 nm residing below a revenue-traffic amplifying region of the applicable optical amplifier. The second wavelength (λ2) resides at about 1563 nm which is above the revenue-traffic amplifying region.

Both the first and second wavelengths are located outside of a flat-gain amplifying region of the optical amplifier. Both the first and second optical wavelengths are nevertheless within a low-loss window of the first optical fiber. As discussed in connection with FIG. 5 below, which shows a system configuration block diagram, the traffic channels may pass through several optical amplifiers when propagating through a system. These channels must operate in a wavelength region where there is minimal degradation through each amplifier, to maximize the long distance performance. It is an important teaching of the present invention to optically terminate and regenerate the supervisory channel at every network element. Consequently, degradation caused by passing through the low performance wavelength region of the amplifier does not accumulate from network element to network element, and can thus be tolerated.

Figure 3:
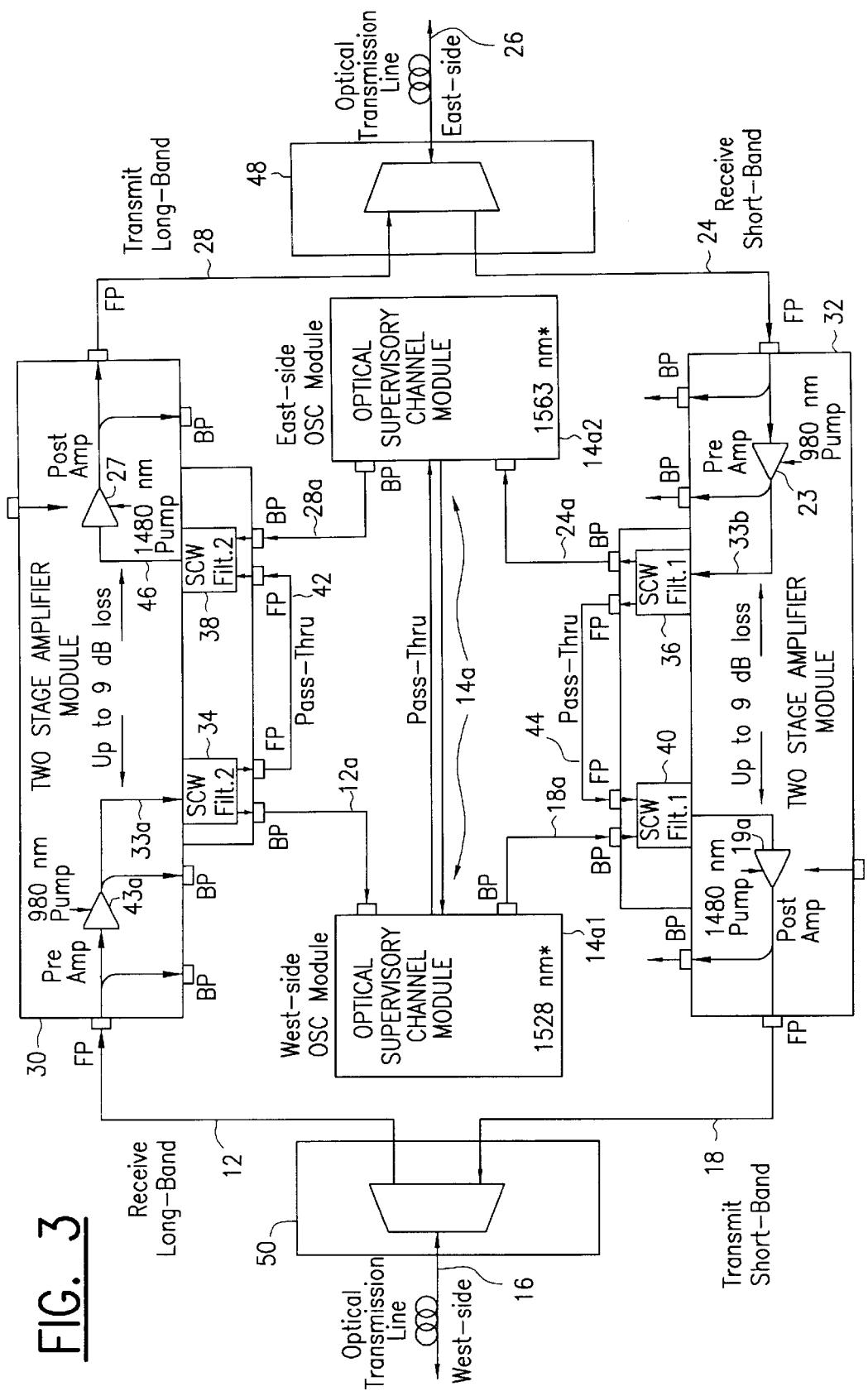
FIG. 3 shows a dual two-stage amplifier module configuration of the network element of FIG. 1B.

For instance, OSC wavelengths can be inserted between the stages of each of two 2-stage erbium-doped fiber amplifier (EDFA) modules 30, 32, as shown in FIG. 3. FIG. 3 shows details of both the two-stage amplifier modules 30, 32, the optical supervisory channel modules 14a1, 14a2 and bidirectional WDM couplers 48, 50. It should be realized that these components are mounted commercially in racks with both back and front-plane connections used to interconnect the various modules. The acronyms "BP" and "FP" denote backplane and frontplane connections, respectively. The "flat gain" region of the EDFA is 1530 to 1560 nm, where the gain is approximately 30 dB. Outside this region, the gain falls off. The two OSC wavelengths are chosen at approximately 1528 nm and 1563 nm, in this example. At these wavelengths, the amplifier has some gain, but it is significantly reduced from 30 dB. The first and second wavelengths are accessible between two stages 13a, 27 or stages 19a, 23 of such a two-stage amplifier module. In this instance, the amplified optical wavelength division multiplexed transmission system divides a revenue-traffic amplifying region of the optical amplifier, with a lower portion being used for transmission in the first direction and an upper portion being used for transmission in the second direction. In this example, the WDM channels grouped by direction are the traffic-carrying channels in the long-band (1545 to 1560 nm) accompanied by the long-band OSC wavelength of 1563 nm and the traffic-carrying channels in the short band (1530 to 1545 nm) accompanied by the short-band OSC wavelength of 1528 nm. The WDM bidirectional filters separate the long-band from the short-band, including the OSC wavelengths.

A given output 33a, 33b of either one of the optical pre-amplifiers 13a, 23 includes both traffic channels and a supervisory channel, as described above. The given supervisory channel 12a, 24a is separated from the traffic channels by a respective filter 34, 36 and provided to the supervisory signal processor 14a which is shown in FIG. 3 in two parts (west-side OSC Module 14a1 and east-side OSC Module 14a2) and where it is terminated. Bidirectional communication, if desired, is made possible by "pass-thru" lines shown connecting the two optical supervisory channel modules 14a1, 14a2. For instance, even though the information contained in the optical supervisory channel signal on the line 12a is terminated as an optical signal in the optical supervisory channel module 14a1, the information can be passed over to the optical supervisory channel module 14a2 on one or more of the electrical pass-thru lines shown interconnecting the two modules. The information can then be provided on the optical line 28a and transmitted on the line 26 in the east-to-west direction, and so on, to a desired destination. Information extracted from the supervisory signal on the line 12a at the module 14a1 can also be utilized in the network element and/or sent back on the regenerated optical signal on the line 18a in the east-to-west direction on the line 16. In any event, the supervisory channels are dropped and added in between the stages of the two-stage amplifier modules 30, 32. SCW Filt. 2 modules 34 and 38 drop and add 1563 nm, respectively. SCW Filt. 1 modules 36, 40 drop and add 1528 nm, respectively. The traffic channels are passed-through on lines 42, 44 for post-amplification in amplifiers 27, 19a along with respective supervisory channel signals 28a, 18a prior to transmission on lines 26, 16, respectively. For instance, the "SCW Filter 2" 38 adds a 1563 nm supervisory channel from line 28a to the 1545–1560 nm traffic channels on the line 42. These are altogether provided on a line 46 to the post-amplifier 27 which amplifies the channels and provides them on the line 28 to a bidirectional WDM coupler (combiner/splitter) module 48 which in turn transmits them on the line 26 in the west-to-east direction 14. A bidirectional WDM coupler 50 on the west-side performs a similar function.

Figure 4:
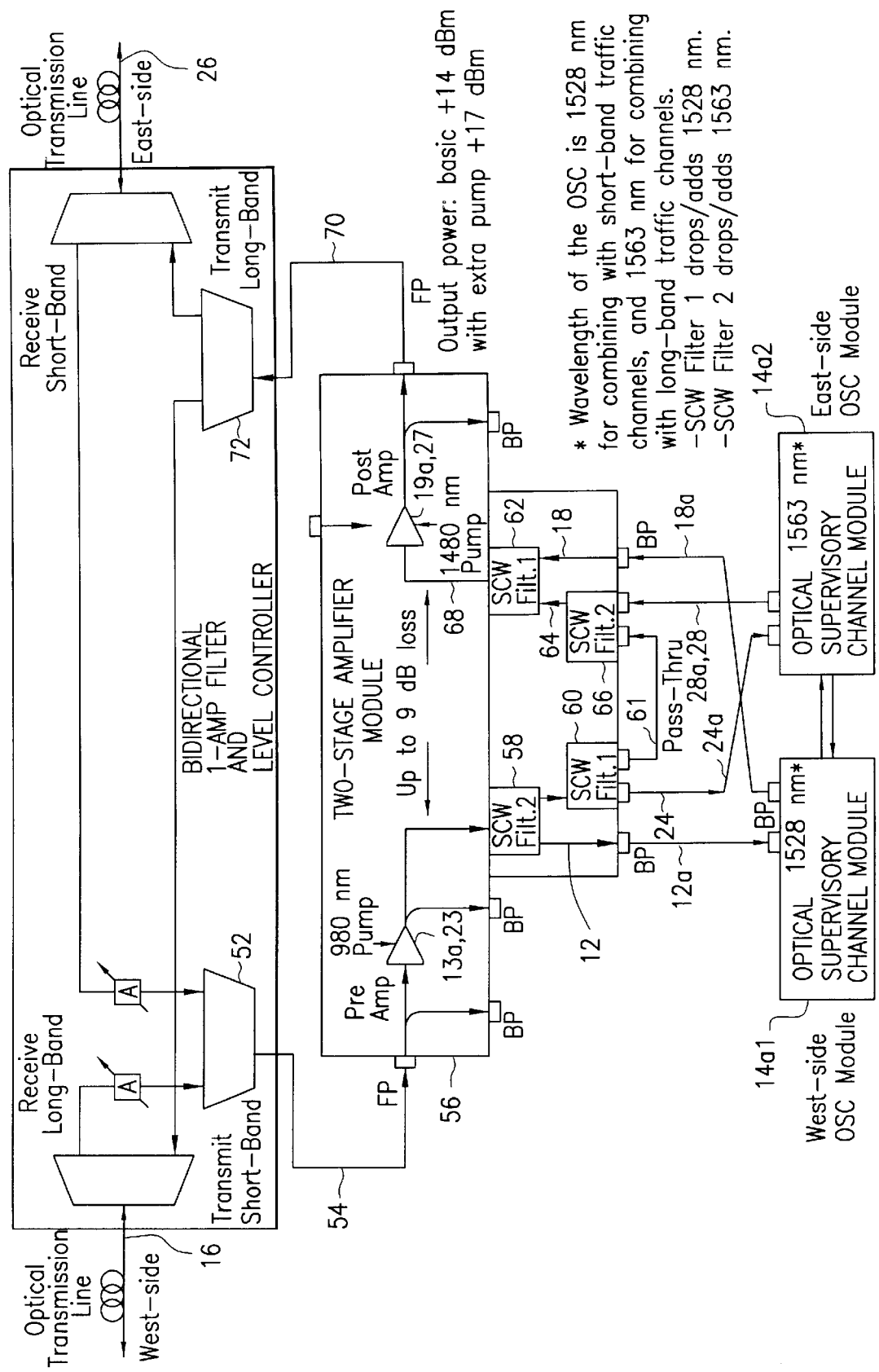
FIG. 4 shows a single two-stage amplifier module configuration of the network element of FIG. 1B.

A single two-stage amplifier embodiment is shown in FIG. 4. Both short-band signals received from the east-to-west direction 20 and long-band signals received from the west-to-east direction are combined in a combiner 52 and provided on a line 54 to a two-stage amplifier 56. It has a first stage amplifier that, together with the combiner 52 and downstream filters 58, 60, fulfills the role of both of the receivers 13a, 23 of FIG. 1B in providing the first and third supervisory channel signals on the lines 12a, 24a, respectively, to the west-side part 14a1 and to the east-side part 14a2 of the supervisory signal processor 14a. The west-side part 14a1 of the supervisory signal processor provides the second supervisory channel signal on the lines 18a, 18 to a filter 62 which adds it to a signal on a line 64 from a filter 66 to form a combined long-band and short-band signal on a line 68 for amplification in an amplifier which combines the functions of the transmitters 19a, 27 of FIG. 1B. The filter 60 also provides the passed-through traffic channels on a line 61 to the filter 66 which combines the traffic channels with the fourth supervisory signal on the lines 28a, 28 to form the signal on the line 64. The post-amplifier 19a, 27 provides an output signal on a line 70 which is split in a splitter 72 into a short-band transmit signal for transmission in the east-to-west direction on the line 16 and a long-band transmit signal for transmission in the west-to-east direction on the line 26.

Another possibility would be to use a pair of wavelengths in the region of 1580 nm and 1590 nm. There is no gain in these regions, but the OSC wavelength would still be able to pass through the EDFA. In that instance, the first and second wavelengths receive a lesser degree of amplification by the amplifier than the revenue traffic.

Figure 5:
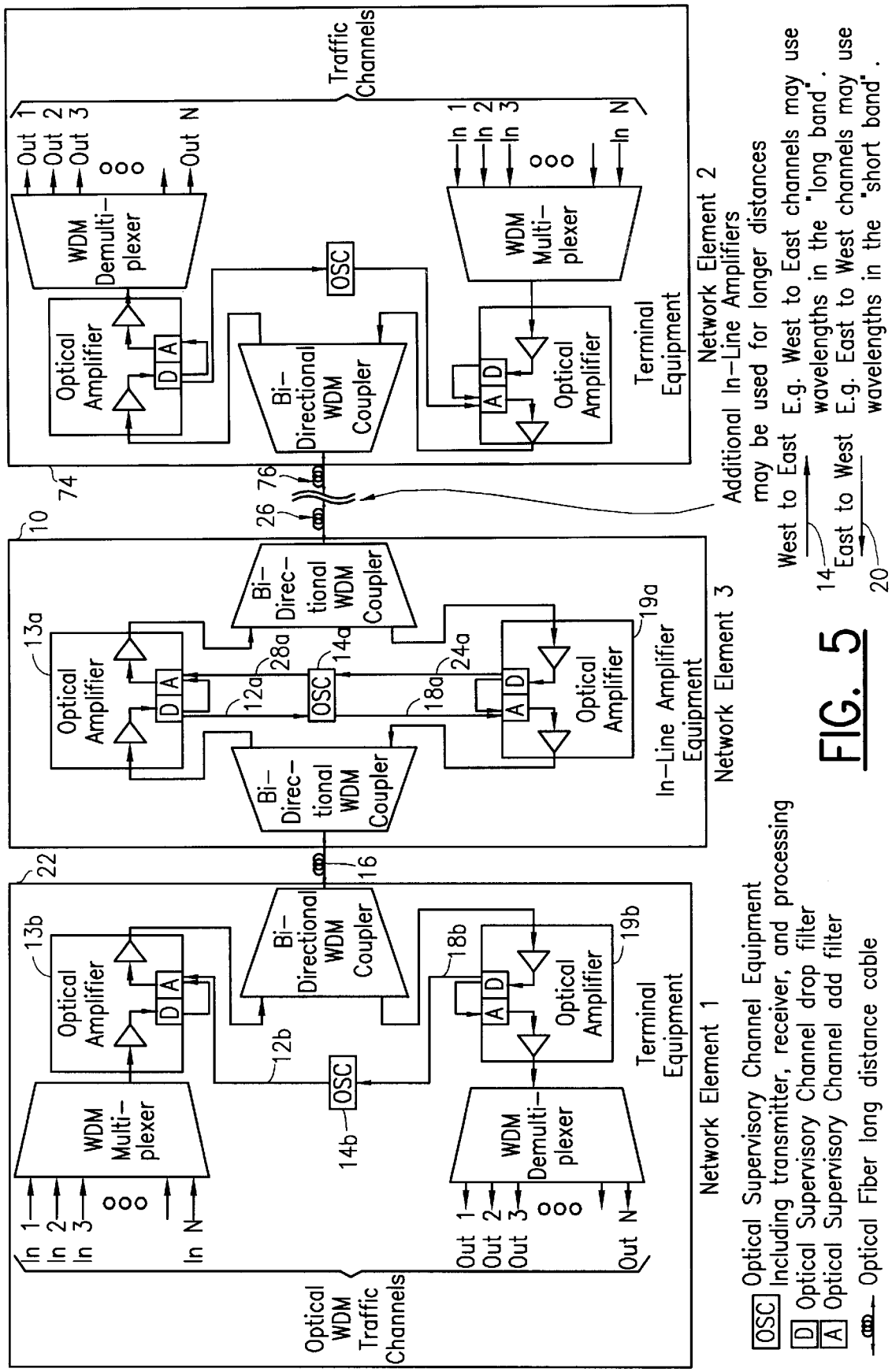
FIG. 5 shows a configuration example of the present invention with a plurality of optical fibers interconnecting terminal equipment separated by one or more in-line amplifier network elements.

FIG. 5 shows a bidirectional wavelength-division-multiplex (WDM) system configuration block diagram. It includes a representation of the network element 22 of FIG. 1A as terminal equipment 22 and a representation of the network element 10 of FIG. 1A as in-line amplifier equipment 10, as well as an additional terminal equipment 74. They are shown including WDM multiplexers and demultiplexers as well as bidirectional WDM couplers which need not be explained in detail. These are interconnected by optical fiber long distance cable 16, 26, . . . , 76. Additional in-line amplifiers may be used for long distances as indicated by a split between the optical fiber long distance cables 26, . . . , 76. Each network element 22, 10, . . . , 74 is shown including optical supervisory channel equipment (OSC) including a not shown transmitter, receiver and processing. Optical amplifiers are shown with associated optical supervisory channel drop and add filters (D, A). It should be noted that the traffic channels may pass through several of these optical amplifiers before reaching the terminal end where they are demultiplexed by WDM demultiplexers, as shown. These traffic channels must operate in the wave-length region where there is minimal degradation through each amplifier, to maximize the long distance performance. Referring back to FIG. 2, the amplifiers may also be gain-flattened to improve uniformity of amplification for all optical traffic channels. Amplifiers with gain-flattening are able to operate with a large number of channels in the flat-gain region. The example of FIG. 2 shows an amplifier gain characteristic with WDM channels is shown in FIG. 2. Referring back to FIG. 5, the optical traffic channels are passed through each amplifier at each network element. The optical supervisory channel wavelength is removed (dropped) from the multi-wavelength WDM composite at the output of the first stage of the amplifier 19b as shown on the line 18b received from network element 10 for instance in the terminal equipment 22 and sent to the local OSC equipment 14b, using a wavelength demultiplex filter (D). A locally generated optical supervisory channel wavelength on the line 12b is added to the multi-wavelength WDM composite at the input of the second stage of the amplifier 13b using a wavelength multiplex filter (A). Because the supervisory channel is terminated and generated at every network element, degradations caused by passing through the low performance wavelength region of the amplifier do not accumulate, and can thus be tolerated.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A method for communicating an optical supervisory channel (OSC) in an optical fiber network, comprising the steps of:

receiving, in a first network element (10), a first optical supervisory channel signal (12) at a first wavelength (λ1) from a first direction (14) on a first optical fiber (16); and transmitting, from said first network element (10), a second optical supervisory channel signal (18) at a second wavelength (λ2) in a second direction (20) on said first optical fiber (16);

wherein said first and second optical supervisory channel signals are transmitted with revenue traffic using wavelength-division-multiplexing;

wherein said first and second wavelengths are selected for passing through an optical amplifier in an amplified optical wavelength division multiplexed transmission system; and wherein said first wavelength (λ1) resides below a revenue-traffic amplifying region of the optical amplifier and said second wavelength (λ2) resides above said revenue-traffic amplifying region, and both said first and second optical wavelengths are in a low-loss window of the first optical fiber.

2. The method of claim 1, further comprising the steps of:

receiving in a second network element 22, said second optical supervisory channel signal (18) at said second wavelength (λ2), and transmitting, from said second network element (22), said first optical supervisory channel signal (12) at said first wavelength (λ1) on said first optical fiber (16).

3. The method of claim 1, further comprising the steps of:

receiving in said first network element (10) a third optical supervisory channel signal (24) at said second wavelength (λ2) from said second direction (20) on a second optical fiber (26), and transmitting, from said first network element (10), a fourth optical supervisory channel signal (28) at said first wavelength (λ1) in said first direction (14) on said second optical fiber (26).

4. The method of claim 1, wherein both said first and second wavelengths are located outside of a flat-gain amplifying region of the optical amplifier.

5. The method of claim 1, wherein said first and second wavelengths receive a lesser degree of amplification by said amplifier than said revenue traffic.

6. The method of claim 1, wherein said revenue traffic amplifying region is 1530 nm to 1560 nm.

7. The method of claim 1, further comprising the steps of:

terminating at least one of said optical supervisory channels; and generating at least one of said optical supervisory channels.

8. A method for communicating an optical supervisory channel (OSC) in an optical fiber network, comprising the steps of:

receiving, in a first network element (10), a first optical supervisory channel signal (12) at a first wavelength (λ1) from a first direction (14) on a first optical fiber (16); and transmitting, from said first network element (10), a second optical supervisory channel signal (18) at a second wavelength (λ2) in a second direction (20) on said first optical fiber (16);

wherein said first and second optical supervisory channel signals are transmitted with revenue traffic using wavelength-division-multiplexing;

wherein said first and second wavelengths are selected for passing through an optical amplifier in an amplified optical wavelength division multiplexed transmission system; and wherein said amplified optical wavelength division multiplexed transmission system divides a revenue-traffic amplifying region of the optical amplifier, with a lower portion being used for transmission in said first direction and an upper portion being used for transmission in said second direction.

9. The method of claim 8, further comprising the steps of:

receiving in a second network element (22), said second optical supervisory channel signal (18) at said second wavelength (λ2), and transmitting, from said second network element (22), said first optical supervisory channel signal (12) at said first wavelength (λ1) on said first optical fiber (16).

10. The method of claim 8, further comprising the steps of:

receiving in said first network element (10) a third optical supervisory channel signal (24) at said second wavelength (λ2) from said second direction (20) on a second optical fiber (26), and transmitting, from said first network element (10), a fourth optical supervisory channel signal (28) at said first wavelength (λ1) in said first direction (14) on said second optical fiber (26).

11. The method of claim 8, wherein both said first and second wavelengths are located outside of a flat-gain amplifying region of the optical amplifier.

12. The method of claim 8, wherein said first and second wavelengths receive a lesser degree of amplification by said amplifier than said revenue traffic.

13. The method of claim 8, wherein said revenue traffic amplifying region is 1530 nm to 1560 nm.

14. The method of claim 8, further comprising the steps of:

terminating at least one of said optical supervisory channels; and generating at least one of said optical supervisory channels.

15. A method for communicating an optical supervisory channel (OSC) in an optical fiber network, comprising the steps of:

receiving, in a first network element (10), a first optical supervisory channel signal (12) at a first wavelength (λ1) from a first direction (14) on a first optical fiber (16); and transmitting, from said first network element (10), a second optical supervisory channel signal (18) at a second wavelength (λ2) in a second direction (20) on said first optical fiber (16);

wherein said first and second optical supervisory channel signals are transmitted with revenue traffic using wavelength-division-multiplexing;

wherein said first and second wavelengths are selected for passing through an optical amplifier in an amplified optical wavelength division multiplexed transmission system; and wherein said first and second wavelengths are accessible between two stages of said optical amplifier.

16. The method of claim 15, further comprising the steps of:

terminating at least one of said optical supervisory channels; and generating at least one of said optical supervisory channels.

17. The method of claim 15, further comprising the steps of:

receiving in a second network element (22), said second optical supervisory channel signal (18) at said second wavelength (λ2), and transmitting, from said second network element (22), said first optical supervisory channel signal (12) at said first wavelength (λ1) on said first optical fiber (16).

18. The method of claim 15, further comprising the steps of:

receiving in said first network element (10) a third optical supervisory channel signal (24) at said second wavelength (λ2) from said second direction (20) on a second optical fiber (26), and transmitting, from said first network element (10), a fourth optical supervisory channel signal (28) at said first wavelength (λ1) in said first direction (14) on said second optical fiber (26).

19. The method of claim 15, wherein both said first and second wavelengths are located outside of a flat-gain amplifying region of the optical amplifier.

20. The method of claim 15, wherein said first and second wavelengths receive a lesser degree of amplification by said amplifier than said revenue traffic.

21. The method of claim 15, wherein said revenue traffic amplifying region is 1530 nm to 1560 nm.

22. The method of claim 15, further comprising the steps of:

dropping at least one of said optical supervisory channels; and adding at least one of said optical supervisory channels.

* * * * *